May 4, 1937. H. K. WATSON Re. 20,354

FUSE CONSTRUCTION

Original Filed Oct. 6, 1932 2 Sheets-Sheet 1

Inventors

Hiram K. Watson

By

Arthur R. Wrayfield Attorney

May 4, 1937. H. K. WATSON Re. 20,354

FUSE CONSTRUCTION

Original Filed Oct. 6, 1932 2 Sheets-Sheet 2

Inventors

By Hiram K. Watson

Arthur R. Wooldridge Attorney

Reissued May 4, 1937 Re. 20,354

UNITED STATES PATENT OFFICE 20,354

FUSE CONSTRUCTION

Hiram K. Watson, Milwaukee, Wis., assignor to Line Material Company, South Milwaukee, Wis., a corporation of Delaware Original No. 1,987,039, dated January 8, 1935, Serial No. 636,434, October 6, 1932. Application for reissue July 13, 1936, Serial No. 90,393

20 Claims. (Cl. 200—133)

This invention relates to fuse constructions, and is particularly directed to a housed expulsion fuse type.

Objects of this invention are to provide a novel form of housed fuse in which a body portion is provided with stationary contacts held in place in a novel manner by means of the cooperation of a locking plate with an undercut hole so that cementing of the bolts, screws or other projecting members within the porcelain is not necessary, and so that it is not necessary to have any exposed bolts or screws extending through the porcelain which thereafter have to be cemented up or covered at their outer ends.

In greater detail, objects of this invention are to provide a novel construction whereby the stationary contacts may be secured either rigidly within the body portion or may be held in a floating manner so that even wide variations may be cared for in an automatic manner, the stationary contacts including the terminal members and a locking plate freely floating as a unit without in any way sacrificing the security of the electrical contact between the fuse mechanism carried by the door and the stationary contacts carried by the body portion.

Further objects are to provide a novel form of latching arrangement for temporarily latching the fuse cartridge to the door which cooperates or interlocks with the stationary contacts, thereby affording at one and the same time means for temporarily locking the door closed, while at the same time insuring a binding action upon the fuse terminals and against the stationary contacts, so that a good electrical contact is automatically insured by the mere closing of the door.

Further objects are to provide brush contacts which are carried by the stationary contacts and which engage contact portions carried by the fuse cartridge, one of said contact portions carried by the fuse cartridge also serving as a lock for the free end of the expulsion link fuse.

Further objects are to provide a novel means of locking the free end of the expulsion fuse link in place and to provide such a construction that it may be simply made, that it inherently tends to lock the free end of the fuse, and that this locking action is augmented by the cooperation of the adjacent brush contacts.

More specifically, the object specified in the foregoing paragraph is to provide for fuse cartridges having an open lower end, a spring actuated fuse link clamping or locking lever mounted on the cartridge and clampingly engaging the end of a fuse link projecting from the open lower end of said tube.

A still further object is to provide for fuse cartridges having an open lower end and a fuse link projecting therefrom, a spring actuated clamping or locking lever pivotally associated with the cartridge, the lever clampingly engaging the link and serving as a conductor connecting the link with a line terminal.

Embodiments of the invention are shown in the accompanying drawings, in which.

Figure 1:
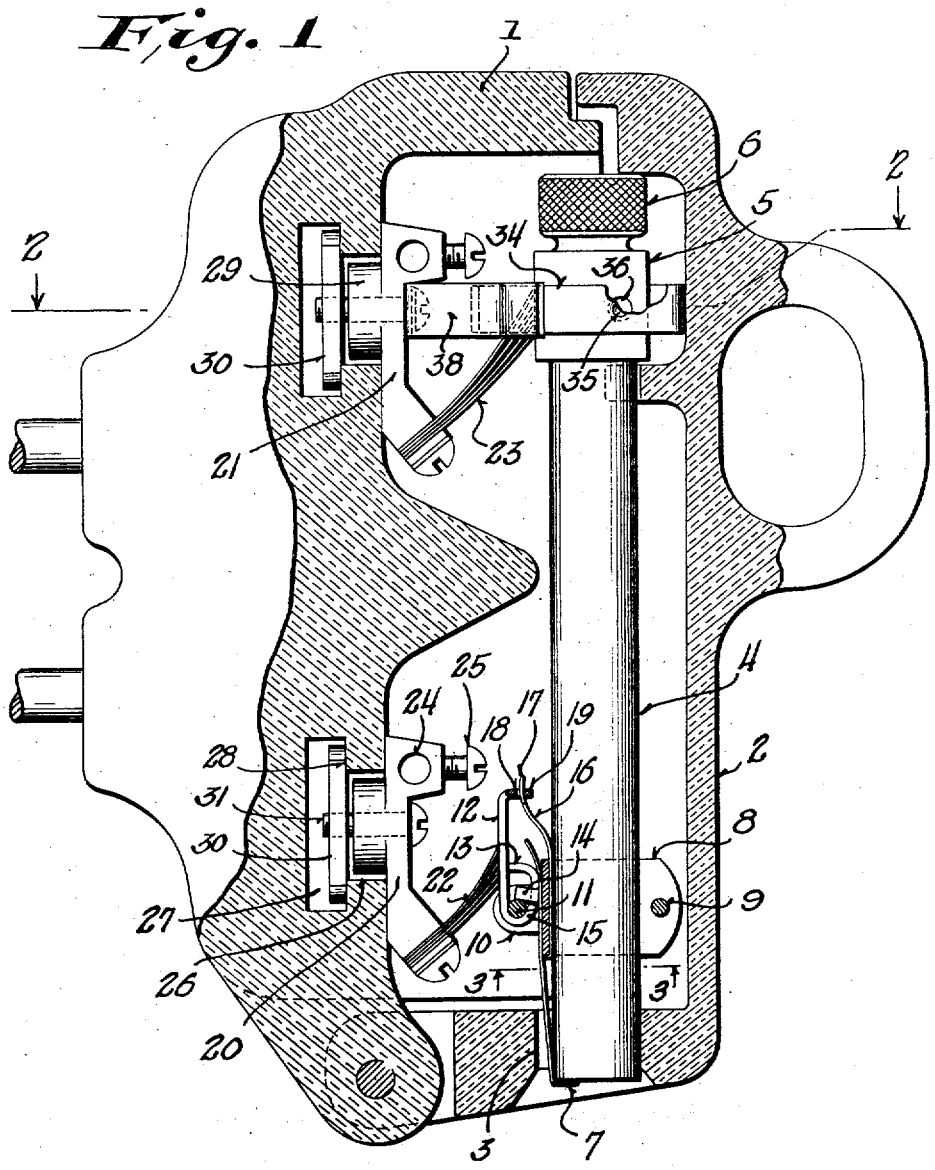
Figure 1 is a vertical sectional view through the body portion and door showing the fuse cartridge in place.

Referring to the drawings, it will be seen that the fuse cutout comprises a body portion 1 formed of porcelain or other suitable material and provided with a hinged door 2, also formed of insulating material. This hinged door is provided with an aperture 3 adjacent its lower end into which or through which the end of the fuse tube or cartridge 4 projects.

Figure 3:
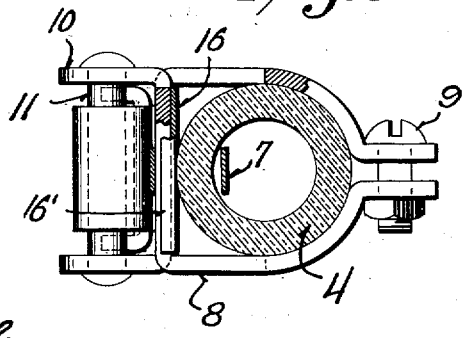
Figure 3 is an enlarged sectional view on the line 3—3 of Figure 1.

This cartridge is provided with an upper terminal member 5 equipped with a cap nut 6 by means of which the upper end of the fuse link may be held clamped to the upper contact in the usual manner. The fuse link 7 extends outwardly through the bottom end of the fuse tube 4 and is held in binding engagement with a saddle-like clip 8 clamped about the lower portion of the fuse tube 4 by means of a bolt 9, as shown in Figure 3. It is to be noted that this saddle-like member has two inwardly turned lips 10 which carry a pintle pin 11, see particularly Figures 1 and 3. The pintle pin pivotally supports a fuse link locking lever or locking member 12, which is formed preferably of sheet metal, as shown most clearly in Figure 1. This member 12 is provided with an inwardly turned portion 13 whose inner end abuts the main body portion of the member 12 and forms with the body portion a somewhat elongated loop. A pair of fingers 14, see Figure 1, are inwardly turned to hold the lever 12 in contact with the pintle pin 11 at the inner end of the loop formed in the member 12, as most clearly shown in Figure 1.

Further, it will be noted that the portion 15 of the member 12 provides somewhat of a cam face which locks or binds against the free end of the fuse link 7 and holds such fuse link tightly in contact with itself and with the adjacent face of the clip 8. It is preferably to hold a small leaf spring 16, see Figure 1, clamped between the saddle-like clip 8 and the fuse tube 4. This leaf spring 16 has a projecting tongue 17 which passes through an aperture 18 formed in the inturned end 19 of the clamping lever 12. It is preferable to provide a small outwardly turned end 16' on the leaf spring, see Figures 1 and 3, which hooks back of the saddle-like clamp or fitting 8.

The leaf spring 16 therefore, urges the clamping lever 12 into binding engagement with the fuse link, as shown in Figure 1. However, it may be released from the fuse link by merely rocking the lever 12 away from the fuse tube. This construction, therefore, provides a very simple means for releasably attaching the free end of the fuse link to the lower terminal or contact member of the fuse.

The body portion carries a lower terminal member or contact member 20 and an upper terminal member or contact member 21. These members are provided with brush contacts 22 and 23 respectively to engage the lower and upper contacts or terminal members of the fuse cartridge or fuse tube. The lower brush member 22 binds against the lever 12 when the cover is in closed position, as shown in Figure 1, and thus cooperates with the lever 12 to securely clamp the free end of the fuse link in place.

Each of the terminal members is provided with any suitable means to receive the ends of the conductors leading to the fuse structure. For instance, each may be provided with an aperture 24 to receive the end of the conductor and a set screw 25 to clamp such end.

Figure 5:
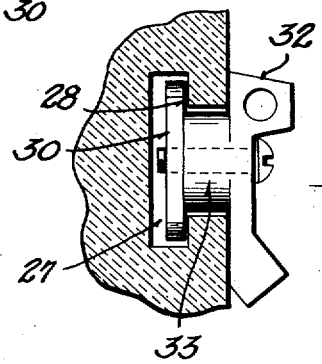
Figure 5 is a view of a modified form of locking means showing a floating type of terminal.

The body portion 1 is provided with an undercut drilled hole or an undercut cast hole adjacent each of the terminal members 20 and 21, as may be seen from reference to Figures 1, 2, 4 and 5. These holes are identical in construction and each comprises preferably a generally rectangular, transversely elongated opening 26, which is provided with an undercut 27, thereby leaving an overhanging shoulder 28 on each side of the elongated opening 26. Figures 1 and 5 show this construction very clearly.

The terminal members 20 and 21 are each provided with a transversely elongated spacer 29 which fits within the transversely elongated hole 26. A locking plate 30 is located in the undercut portion or cutout 27 and is held to the member 29 by means of a pair of screws 31.

It is obvious that the locking plates 30 may be turned transversely and slipped through the elongated hole 26 and thereafter may be turned crossways of the holes 26, so that they engage the shoulders 28 of the undercut, see Figure 1. Thereafter the screws are tightened, thus locking the terminal members 20 and 21 securely in place.

If the boss or spacing member 29 is made slightly short, as shown in Figure 1, a true clamping action occurs and the terminal members are held rigidly in place. However, it is sometimes desirable to provide a free floating terminal member either at the upper or lower terminal member or at both places to take care of inaccuracies that may occur in the manufacture of the device.

To secure this free floating action, the terminal member, such for instance as indicated at 32 in Figure 5, may be provided with a boss or spacer 33 which is slightly longer than the overhanging wall above or in front of the undercut 27. In this case the locking plate or elongated nut 30 does not engage the shoulders 28 and thus a slight adjustment is permitted, thereby securing free floating for the terminal members, while in no way interfering with their secure electrical contact with the contacts of the fuse clip or their secure attachment to the incoming conductors.

Figure 2:
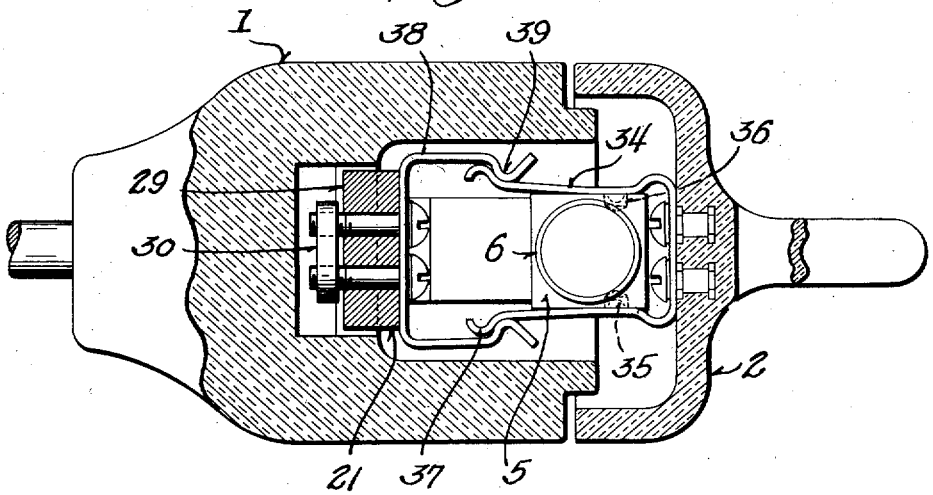
Figure 2 is a transverse sectional view on the line 2—2 of Figure 1.
Figure 4:
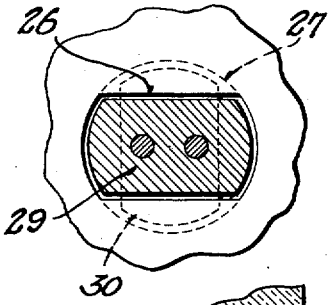
Figure 4 is a fragmentary view showing a detail of the locking means.

It is also a feature of this invention to provide a novel form of latching means for latching the fuse to the door. For example as shown in Figures 1 and 2, the door is provided with a pair of spring latching arms or movable contact arms 34 between which the upper contact 5 of the fuse is positioned. These spring arms are preferably provided with slightly indented portions or nibs 35 which fit within recesses 36 formed in the contact 5 and thus tend to lock the fuse in place even when the door is open.

The U-shaped spring arms 34 are provided with outwardly turned or rounded end portions 37 which are received between the stationary contact arms or spring arms 38 of the upper terminal member, as indicated in Figures 1 and 2. It is preferable to provide the spring arms 38 with inwardly turned or inwardly rounded portions 39 so that a true interlocking action occurs, as shown in Figure 2. This construction produces a locking action for the door in addition to securing a binding action between the arms 34 and the upper contact 5 of the fuse and also a binding action between the arms 34 and 38, thus securing a very reliable electrical contact.

It is to be noted particularly that this invention provides interlocking means which may be very simply formed of ordinary strap copper or brass or similar material. Further, it will be seen that the locking means for the fuse link also may be formed of strap material in a very simple manner.

An additional point which is to be particularly noted is that the terminal members are secured to the body portion by the coöperation of the locking plate with the undercut cast or drilled holes formed in the body portion, and thereby there are no exposed end metal portions, such as bolts, or screws, which have to be cemented over or otherwise protected in the finished product. It is, of course, obvious that this construction could be followed for other types of fuse than the expulsion fuse chosen for illustration. In other words, the manner of securing the terminal means and the provision of brush contacts could be followed whether an expulsion type or some other type of fuse were used.

It will be seen further that a very simple locking means has been provided which not only locks the door closed, but also causes an interlocking of the movable and stationary contacts and a secure gripping action upon the upper contact of the fuse cartridge.

Further, it will be seen that a very simple and effective means have been provided for locking the lower or free end of the fuse link in place.

The foregoing disclosure also makes it apparent that I have provided a novel fuse link clamping lever which directly engages the projecting end of the fuse link and serves as a conductor between the link and the line terminal or brush contact 22.

Although this invention has been described in considerable detail, it is to be understood that such description is intended as illustrative rather than limiting, as the invention may be variously embodied and it is to be interpreted as claimed.

I claim:

1. A fuse comprising a housing, terminals mounted within said housing, one of said terminals having a contact, the other of said terminals having a U-shaped spring contact provided with inturned portions, a door for said housing, a fuse cartridge carried by said door, said fuse cartridge having a contact adjacent one end provided with indentations, a spring clip carried by said door and provided with projections adapted to enter the indentations of said fuse contact, said spring clip having projecting ends adapted to be received between the inturned ends of the said U-shaped spring contact, said fuse cartridge having a second contact engageable by said first mentioned contact.

2. A fuse comprising a housing, terminals mounted within said housing, one of said terminals having a contact, the other of said terminals having a U-shaped spring contact provided with inturned portions, a door for said housing, a fuse cartridge carried by said door, said fuse cartridge having a contact adjacent one end provided with indentations, a spring clip carried by said door and provided with projections adapted to enter the indentations of said fuse contact, said spring clip having projecting ends adapted to be received between the inturned ends of the said U-shaped spring contact, said fuse cartridge having a second contact engageable by said first mentioned contact, said door having a lower portion for engaging the lower portion of said fuse cartridge, and said first mentioned contact forcing the lower portion of said fuse cartridge into engagement with the lower portion of said door.

3. A fuse comprising a fuse cartridge having a contact adjacent one end thereof, a second contact spaced from the other end of and embracing said fuse cartridge, a fuse link electrically joining said contacts and threaded through said cartridge around one end thereof with the free end of the fuse link located adjacent said second mentioned contact, and a movable clamping lever pivotally carried by said second mentioned contact for clamping the free end of said fuse link in direct engagement with said second contact.

4. A fuse comprising a fuse cartridge having a contact adjacent one end thereof, a second contact spaced from the other end of and embracing said fuse cartridge, a fuse link electrically joining said contacts and threaded through said cartridge around one end thereof with the free end of the fuse link located adjacent said second mentioned contact, a clamping lever pivotally carried by said second mentioned contact for clamping the free end of said fuse link in direct engagement with said second contact, and a spring for urging said lever into fuse link clamping position.

5. A fuse construction comprising a housing, terminals mounted within said housing, one of said terminals having contact means, the other of said terminals having brush contact means, a fuse cartridge comprising a tube having an open end and a contact adjacent the other end thereof, said contact being engageable by said first mentioned contact, said fuse cartridge having a contact adjacent its open end, a fuse link electrically joining the contacts of said fuse cartridge and looped outwardly about the open end of said fuse cartridge and having a free end adjacent the last mentioned contact of said fuse cartridge, a lever pivotally mounted upon said last mentioned contact of said fuse cartridge and having a cam face to clamp the free end of said fuse link against such contact, and a spring for urging said lever into clamping position, said brush contact engaging said lever when said device is in operative position and additionally urging said lever towards clamping position.

6. An expulsion fuse cartridge comprising a tube having an open end, a contact carried adjacent the opposite end of said tube, a contact clamped around said tube adjacent the open end thereof, a fuse link joining said contacts and threaded through said tube and looped around the open end of said tube, and having its free end adjacent the contact clamped about said tube, a lever pivoted to said last mentioned contact and having a cam portion for binding the free end of said fuse link to such contact, and a spring clamped in position by said last mentioned contact and urging said lever to clamping position.

7. In a fuse construction, the combination of a housing, said housing having spaced recesses opening into said housing only, terminals located within said housing, and means releasably interlocking with said housing adjacent said recesses for holding said terminals in place.

8. In a fuse construction, the combination of a housing having spaced undercut recesses opening into said housing only, terminals located adjacent said recesses, and means located within the undercut of said recesses for clamping said terminals in place.

9. In a device of the class described, an insulating body portion having spaced undercut recesses opening through one face only of said body portion, terminals located adjacent said recesses, and means located within the undercut of said recesses and operatively connected to said terminals for clamping said terminals to said body portion.

10. In a fuse construction, the combination of a housing having spaced, undercut recesses opening into said housing only, terminals located within said housing adjacent said recesses, members retained within the undercut portion of said recesses, and screws operatively connecting each terminal with its corresponding member.

11. In a fuse construction, the combination of a housing having spaced apertures, each aperture being provided with an elongated portion and an undercut inner portion terminating in a closed end, terminals mounted within said housing adjacent to apertures, elongated members passable through the elongated portion of the apertures and adapted to be turned transversely thereof, and screws passing through the terminals and engaging the elongated members and locking said terminals in place.

12. In a fuse construction, the combination of a housing having spaced apertures, each aperture being provided with an elongated portion and an undercut inner portion terminating in a closed end, terminals mounted within said housing adjacent to apertures, elongated members passable through the elongated portion of the apertures and adapted to be turned transversely thereof, screws passing through the terminals and engaging the elongated members and locking said terminals in place, and spacers positioned between said elongated members and said terminals.

13. In a fuse construction, a fuse cartridge having an open end and relatively spaced contact means mounted on said cartridge, one of said contact means being adjacent said open end, and including a pivoted clamping lever, a fuse link in said cartridge electrically connecting said contact means and having one end projecting from said open end and clamped by said lever to a portion of said one of said contact means, and spring means mounted on said tube and coacting between said tube and said lever, thereby to hold the projecting end of said link in clamped position, said lever being movable only about a single pivotal axis.

14. In a fuse construction, a fuse cartridge having an open end and relatively spaced contact means mounted thereon, and a fuse link in said cartridge electrically connecting said contact means and projecting from said open end, one of said contact means including a clamp having a single pivotal axis and resiliently biased to clamping engagement with the projecting end of said fuse link.

15. In a fuse construction, a fuse cartridge having an open end and relatively spaced contact means mounted thereon, and a fuse link in said cartridge electrically connecting said contact means and projecting from said open end, one of said contact means including a clamping lever having a single pivotal axis and a spring urging said lever into clamping engagement with the projecting end of said fuse link.

16. In a fuse construction, a fuse cartridge closed at one end and open at the other end and provided with a contact at its closed end, a fuse link in said cartridge projecting from the open end thereof, and link clamping means adjacent the open end of said cartridge, said means including a contact member, a lever movable about a single pivotal axis on said member and a spring urging said lever about its pivot into clamping engagement with said link and contact member.

17. In a fuse construction, a fuse cartridge closed at one end and open at the other end and provided with a contact at its closed end and a support embracing the cartridge in spaced relation to said contact and to the open end of said cartridge, a clamping lever having a single pivotal axis on said support, and clamping means on said tube including a spring urging said lever into clamping relation to said means, and a fuse link in said cartridge having one end projecting from the open end of the cartridge and clamped between said lever and means.

18. In a fuse construction, an insulating support having a pair of relatively spaced terminal members, a fuse cartridge having contact members engaging said terminal members, and a fuse link electrically connecting said contact members, one of said contact members including a clamping lever engaging said link and one of said terminal members, thereby serving as a conducting member between said link and last-mentioned terminal member.

19. In a fuse construction, an insulating support having a pair of relatively spaced terminal members, a fuse cartridge pivotally mounted on said support and having contact members engaging said terminal members, and a fuse link in said tube electrically connecting said contact members and projecting from one end of said tube, one of said contact members including a lever pivotally connected with said tube, the projecting end of said link being in clamped and electrical contact with said lever and the lever being in contact with one of said terminal members, whereby the lever serves as conducting means between the fuse link and last-mentioned terminal member.

20. In a fuse construction, a fuse cartridge having an open end and relatively spaced contact means mounted thereon, one of said contact means comprising a relatively rigid member secured to said tube and a clamping lever pivotally connected at one end with said relatively rigid member, co-acting clamping means on said member and said lever, and a spring mounted on said tube and urging the free end of said clamping lever about said pivot.

HIRAM K. WATSON.